United States Patent [19]

Buechner et al.

[11] 4,093,703

[45] June 6, 1978

[54] REMOVAL OF ETHYLENE FROM GASES

[75] Inventors: Oskar Buechner, Ludwigshafen;
Herbert Geierhaas, Heidelberg;
Volker Gierth, Ludwigshafen;
Siegfried Mueller, Limburgerhof;
Wieland Zacher, Wesseling, all of
Germany

[73] Assignee: BASF Aktiengesellschaft,
Ludwigshafen, Germany

[21] Appl. No.: 763,927

[22] Filed: Jan. 31, 1977

Related U.S. Application Data

[63] Continuation of Ser. No. 638,955, Dec. 8, 1975, abandoned, which is a continuation-in-part of Ser. No. 621,522, Oct. 10, 1975, abandoned, which is a continuation of Ser. No. 431,580, Jan. 7, 1974, abandoned.

[30] Foreign Application Priority Data

Jan. 10, 1973 Germany .................. 2301016

[51] Int. Cl.$^2$ .............................................. B01D 53/34
[52] U.S. Cl. .................................................... 423/245
[58] Field of Search ............ 423/219, 245, 247, 213.2, 423/213.5

[56] References Cited

U.S. PATENT DOCUMENTS 3,124,416   3/1964   Cohn et al. ..................... 423/219

Primary Examiner—Earl C. Thomas
Attorney, Agent, or Firm—Keil, Thompson & Shurtleff

[57] ABSTRACT

The removal of ethylene from gases which contain the ethylene in a concentration of not more than 1.8% by volume by means of a supported palladium catalyst which contains from 0.05 to 10 g of palladium per liter of an inert inorganic carrier, the oxidation reaction being started at a temperature of from 180° to 200° C.

1 Claim, No Drawings

REMOVAL OF ETHYLENE FROM GASES

This application is a continuation of application Ser. No. 638,955, filed Dec. 8, 1975, now abandoned, which was a continuation-in-part of application Ser. No. 621,522, which was filed on Oct. 10, 1975 and now abandoned, which application was a continuation of application Ser. No. 431,580, which was filed on Jan. 7, 1974, and is now abandoned.

The present invention relates to the use of a supported palladium catalyst for the oxidative removal of ethylene from industrial exhaust air by passing said industrial exhaust air containing said ethylene over a supported palladium catalyst which contains 0.5 to 10 g of palladium per liter of an inorganic carrier.

The removal of small amounts of olefins from air is often a problem in industry. Small amounts of ethylene in air may for example be removed by adsorption by means of activated carbon, silica gels or molecular sieves. The adsorption methods necessitate considerable expenditure for apparatus however because they are two-stage methods. Adsorption takes place in the first stage and regeneration in the second. Another disadvantage of prior art methods is to be seen in the fact that silica gel and molecular sieves adsorb water and carbon dioxide more readily than ethylene from air containing ethylene. In the desorption of the ethylene cracked constituent often remain on the molecular sieves so that the adsorption behavior of the regenerated molecular sieves becomes progressively worse.

It is known that for the oxidative removal of small amounts of ethylene from air oxidic catalysts, for example copper oxide on aluminum oxide, may be used. These catalysts have the disadvantage that it is only at temperatures above 260° C that they catalyze the oxidation of ethylenically unsaturated hydrocarbons. To guard against explosions an endeavor is made to heat the catalyst bed with steam rather than electrically. Since usually medium pressure steam at 15 to 20 atmospheres gauge is available for heating purposes, the prior art catalysts cannot be heated therewith to the necessary working temperature.

According to the invention a conventional supported palladium catalyst carrier is used for the oxidative removal of ethylene from a gas which contains the ethylene in a concentration of not more than 1.8% by volume in air, the oxidation reaction being started at a temperature of from 180° to 200° C.

The catalysts to be used according to the invention are commercially available. They are used for fine purification of gases, for example for the catalytic removal of oxygen or hydrogen from other gases. The catalysts are mainly used for the purification of ammonia synthesis gas. They contain from 0.05 to 10 g and preferably from 0.08 to 1 g of palladium to each liter of an inert inorganic carrier such as silica gel, aluminum oxide or magnesium oxide or mixtures of the said substances. It is surprising that by means of supported palladium catalysts it is possible in the case of gases containing ethylene in a concentration of not more than 1.8% by volume in air to remove, i.e. to initiate oxidation of, the ethylenically unsaturated hydrocarbon at temperatures of from 180° to 200° C. It is therefore possible to heat the supported palladium catalysts indirectly by means of medium pressure steam (15 to 20 atmospheres gauge) to the necessary initiation and reaction temperature.

Ethylene may also be removed from nitrogen and carbon dioxide by means of the catalyst according to the invention, provided oxygen is added to the said gases.

Industrial exhaust air may be purified by passing it over a layer of supported palladium catalyst heated to about 180° C. At ethylene concentrations of from 0.5 to 1.5% by volume in the exhaust air the content of ethylene remaining in the air after it has passed through the bed of catalysts is relatively less than in the case of concentrations smaller than this. At concentrations of from 0.5 to 1.5% by volume of ethylene in the exhaust air the heating of the catalyst bed can be switched off after the reaction has started. The heat liberated by the oxidation keeps the bed of catalyst (insulated externally) at the necessary operating temperature. In the region of very low concentrations, for example less than 0.5% by volume of ethylene, it has been found that the rate of oxidation is appreciably higher if the catalyst remains constantly heated, i.e. not only during the period when the exhaust air is in contact with the catalyst. For substantial removal of ethylene from industrial exhaust air it is not necessary for the exhaust air to be purified to be heated up to the working temperature of the catalyst. The maximum ethylene concentration of the exhaust air is 1.8% by volume.

The invention will be further illustrated in the following Examples. Industrial exhaust air is used in all the Examples. The ethylene content of the exhaust air is constant. The exhaust air is passed through a mixing zone charged with Raschig rings before it is passed over the bed of catalyst. In the Examples the supported palladium catalyst is arranged in jacketed glass tubes of various widths and in a jacketed iron tube. Heating of the jacketed glass tubes is carried out by means of a special oil as heat transfer agent; the jacketed iron tube is heated with steam at 15 atmospheres gauge. The ethylene concentrations before and after purification of the exhaust air is determined by gas chromatography. The samples are taken after two hours of reaction under steady-state conditions.

EXAMPLE I

The supported palladium catalyst used contains 0.125% by weight of palladium on aluminum oxide. It is used in the form of cylinders having an average length of 8 mm and a diameter of 3.5 mm. The apparatus used are (A) a glass apparatus having an internal diameter of 48 mm and a length of 60 cm and (B) a jacketed iron tube having an internal diameter of 25 mm and a length of 200 cm.

The glass apparatus is heated to a temperature of 200° C by means of a special oil as heat transfer agent and the jacketed iron tube is heated to a temperature of 195° C with medium pressure steam. The reaction conditions and the results obtained are collected in Table 1 in which column 1 indicates the apparatus used;
column 2 gives the throughput of gas in m$^3$ per hour per m$^3$ of catalyst;
column 3 gives the flow rate in meters per second;
column 4 gives the initial ethylene concentration in ppm;
column 5 gives the final ethylene concentration in ppm.

TABLE 1

| 1 | 2 | 3 | 4 | 5 |
|---|---|---|---|---|
| B | 280 | 0.16 | 1200 | 90 |

TABLE 1-continued

| 1 | 2 | 3 | 4 | 5 |
|---|---|---|---|---|
| B | 600 | 0.32 | 1000 | 2 |
| B | 250 | 0.14 | 970 | <1 |
| A | 610 | 0.10 | 1400 | <1 |
| A | 610 | 0.10 | 2700 | 120 |

EXAMPLE 2

The jacketed glass tube described in Example 1 is used with a supported palladium catalyst containing 0.125% by weight of palladium on silica gel. The heat transfer agent passed through the tube has a temperature of 190° C. The ethylene content of the exhaust air is 0.75% by volume. The exhaust air to be purified is passed over the catalyst at a rate of flow (in relation to the free tube cross-section) of 0.1 meter per second. The throughput in relation to the volume of the bed of catalyst is 610 m$^3$ of exhaust air per hour per m$^3$ of catalyst bed. The content of ethylene in the gas at the outlet from the jacketed tube is only 4 ppm.

EXAMPLE 3

Example 2 is repeated but a supported palladium catalyst is used which contains 0.5% by weight of palladium. The ethylene content of the purified exhaust air at the outlet from the jacketed tube is 20 ppm.

We claim:

1. A process for the oxidative removal of ethylene from industrial exhaust air which comprises: passing said industrial exhaust air which contains ethylene in a concentration of not more than 1.8% by volume over a supported palladium catalyst containing from 0.05 to 10 g of palladium per liter of an inert inorganic carrier, said oxidation reaction being started at a temperature of from 180° to 200° C.

* * * * *